US010225913B2

(12) United States Patent
Roosli

(10) Patent No.: US 10,225,913 B2
(45) Date of Patent: Mar. 5, 2019

(54) LIGHTBULB IN A FIXTURE HAVING A CONFIGURATION MEMORY

(71) Applicant: Honeywell International Inc., Morris Plains, NJ (US)

(72) Inventor: Philipp Anton Roosli, Niantic, CT (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/838,169

(22) Filed: Dec. 11, 2017

(65) Prior Publication Data

US 2018/0116042 A1 Apr. 26, 2018

Related U.S. Application Data

(63) Continuation of application No. 15/182,206, filed on Jun. 14, 2016, now Pat. No. 9,848,480.

(51) Int. Cl.
*H05B 37/02* (2006.01)
*H05B 33/08* (2006.01)

(52) U.S. Cl.
CPC ....... *H05B 37/0272* (2013.01); *H05B 33/086* (2013.01); *H05B 37/029* (2013.01); *H05B 37/0218* (2013.01); *H05B 37/0236* (2013.01); *H05B 37/0245* (2013.01); *H05B 37/0263* (2013.01)

(58) Field of Classification Search
CPC ............ H05B 37/0218; H05B 37/0236; H05B 37/0245; H05B 37/0263; H05B 37/0272; H05B 37/029

USPC ......................................... 315/152, 307, 312
See application file for complete search history.

(56) References Cited

U.S. PATENT DOCUMENTS

| 7,199,701 | B2 | 4/2007 | Kates |
| 8,143,803 | B2 | 3/2012 | Beij et al. |
| 8,328,582 | B1* | 12/2012 | Carley ................. H01R 33/94 439/642 |
| 8,896,218 | B2* | 11/2014 | Bora ................. H05B 33/0863 315/185 R |
| 9,510,400 | B2* | 11/2016 | Scapa .................... H05B 33/08 |

(Continued)

FOREIGN PATENT DOCUMENTS

| CN | 103346444 A | 10/2013 |
| WO | 2009084016 A2 | 7/2009 |

OTHER PUBLICATIONS

"Wireless Mesh Networks," 2 pages, downloaded Apr. 19, 2016.

(Continued)

*Primary Examiner* — Tung X Le
(74) *Attorney, Agent, or Firm* — Seager, Tufte & Wickhem LLP

(57) ABSTRACT

An internet of things system having a smart light bulb and a smart fixture. The smart light bulb may be inserted into and connect with the smart fixture for power to the smart light bulb. The smart light bulb may be configured by reading configuration information from a memory in the smart fixture. As a whole, the system may have two or more smart light bulbs inserted in two or more smart fixtures, respectively. The two or more smart light bulbs may be interconnected with one another with communication links to make up a mesh network. Non-bulb devices may be connected to the mesh network.

20 Claims, 3 Drawing Sheets

(56) References Cited

U.S. PATENT DOCUMENTS

| | | | |
|---|---|---|---|
| 9,826,604 B2 * | 11/2017 | Karc | H05B 37/0272 |
| 9,848,480 B1 | 12/2017 | Roosli | |
| 2002/0047546 A1 | 4/2002 | Kayser | |
| 2006/0220835 A1 | 10/2006 | Kates | |
| 2008/0169910 A1 | 7/2008 | Greene et al. | |
| 2009/0289582 A1 | 11/2009 | Armitage et al. | |
| 2010/0236824 A1 | 9/2010 | Roosli | |
| 2013/0082527 A1 | 4/2013 | Liao et al. | |
| 2014/0049164 A1 | 2/2014 | McGuire et al. | |
| 2014/0049972 A1 * | 2/2014 | McGuire | F21V 21/00 362/427 |
| 2014/0062659 A1 | 3/2014 | Roosli et al. | |
| 2014/0190679 A1 | 7/2014 | Roosli et al. | |
| 2014/0327355 A1 * | 11/2014 | Chen | H05B 37/0272 315/34 |
| 2015/0173156 A1 * | 6/2015 | Pedersen | H05B 37/0272 315/151 |
| 2015/0276268 A1 | 10/2015 | Hazzard et al. | |
| 2016/0020590 A1 | 1/2016 | Roosli et al. | |
| 2016/0123541 A1 * | 5/2016 | Quilici | F21K 9/233 315/210 |

OTHER PUBLICATIONS

Chang, "Spark Socket Connects Your Regular Old Light Bulbs to the Internet," Available at https://www.wired.com/2012/11/spark-devices-connects-your-regular-old-lig- ht-bulbs-to-the-internet/, 2 pages, printed Mar. 17, 2017.

http://www.instructables.com/id/5-RF-Controlled-Light-Sockets/, "Cheap Arduino Controlled Light Sockets—Reverse Engineering . . . ," 13 pages, printed Mar. 17, 2017.

http://www.postscapes.com/wifi-light-socket-ember/, "Ember, Postcapes," 9 pages, printed Mar. 17, 2017.

Quick, "Spark Smartens Up Any Standard Light Socket," Available at http://newatlas.com/spark-smart-light-bulb-socket/25187/, 5 pages, Nov. 27, 2012.

RongMao et al., "Smart Part With Internet of Things Technology," Unable to Obtain this Reference, prior to Jun. 11, 2015.

* cited by examiner

# LIGHTBULB IN A FIXTURE HAVING A CONFIGURATION MEMORY

This application is a Continuation of U.S. patent application Ser. No. 15/182,206, filed Jun. 14, 2016. U.S. patent application Ser. No. 15/182,206, filed Jun. 14, 2016, is hereby incorporated by reference.

BACKGROUND

The present disclosure pertains to smart light bulbs and particularly to light bulbs having configurations.

SUMMARY

The disclosure reveals an internet of things system having a smart light bulb and a smart fixture. The smart light bulb may be inserted into and connect with the smart fixture for power to the smart light bulb. The smart light bulb may be configured by reading configuration information from a memory in the smart fixture. As a whole, the system may have two or more smart light bulbs inserted in two or more smart fixtures, respectively. The two or more smart light bulbs may be interconnected with one another with communication links to make up a mesh network. Non-bulb devices may be connected to the mesh network.

DESCRIPTION

Figure 1:
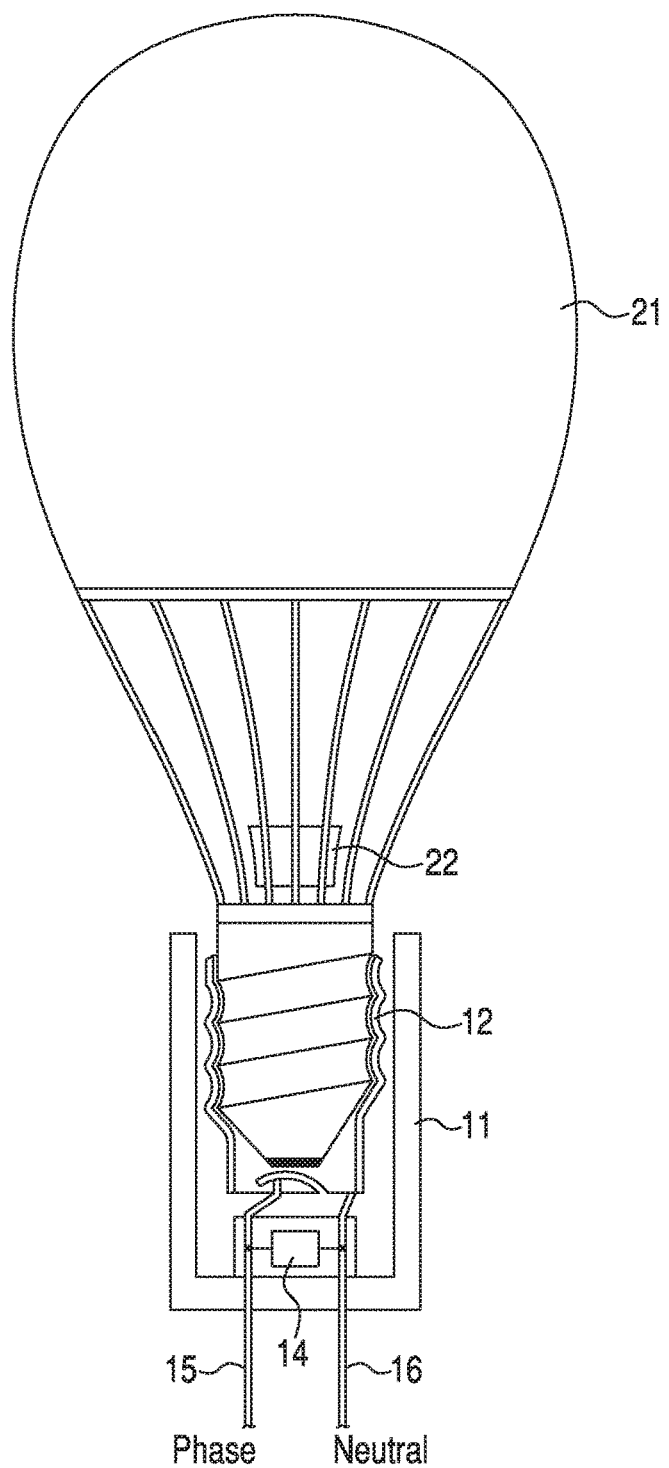
FIG. 1 is a diagram that shows an overall setup of the present arrangement.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A core element of IoT devices is that they may need to be configured, such as being programmed with a device address, device descriptor, location information and possibly other installation dependent settings. When a device is being replaced, it may take time and effort to configure the replacement part. This effort may add to the total cost of ownership. As the number of light bulbs is high in a building, the cost may be exceptionally large for light fixtures and light bulbs in particular.

A memory chip may be added to a light bulb socket or fixture. The light bulb may then read/write the memory once installed into a resulting smart socket or fixture. A broken light bulb can now be easily removed and a spare light bulb installed. The spare light bulb may simply read the previous configuration settings from the memory in the smart light fixture or socket.

The memory chip may be a two or single wire memory. The connection to the bulb could occur through contacts. Alternatively, a wireless memory tag may be affixed to the smart socket or light fixture that can be read by the light bulb (e.g., an RFID tag reader in the light bulb and an RFID tag in the fixture or socket).

The present device or system may have a smart socket that provides information for the smart light bulb. The smart light bulb may obtain information from an external location, i.e., a smart socket. The smart socket may provide support for the smart light bulb.

FIG. 1 is a diagram that shows an overall setup of the present arrangement. Item 11 may be a socket housing. Item 12 may be a socket thread for the threaded base of light bulb 21. Lines 15 and 16 may provide the phase (hot) and neutral (e.g., ground) inputs, respectively, of a power feed from a live voltage. A configuration electronics 14 may incorporate a low power RF transmitter, memory, receiver and a processor and be connected to lines 15 and 16 for power. Control electronics 22 of the IoT or smart light bulb 21 may be situated in a structure of bulb 21.

Figure 2:
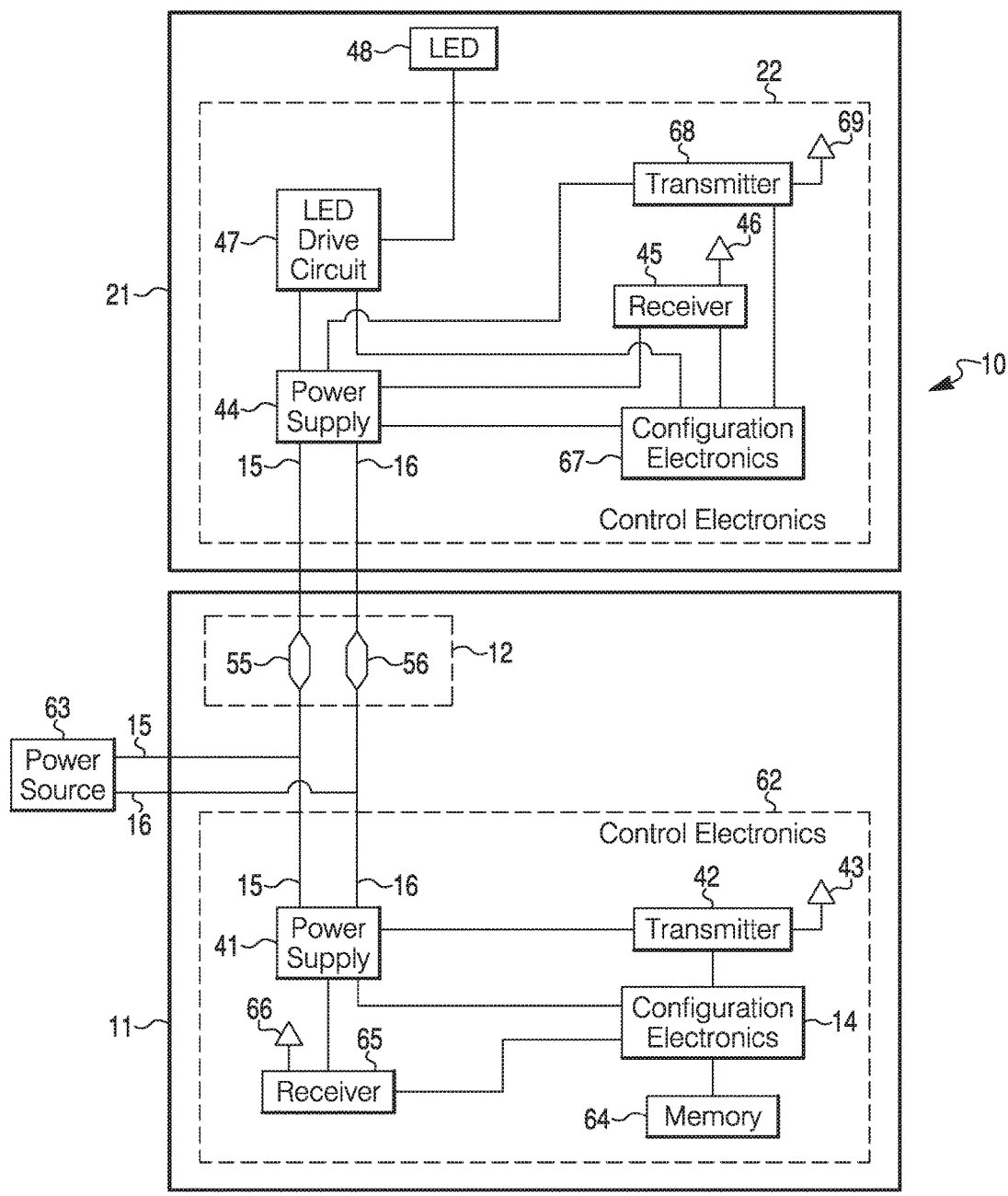
FIG. 2 is a diagram of a low power transmitter in a socket and a transmitter or radio that may be in control electronics.

FIG. 2 is a diagram of example circuitry 10 for smart socket or fixture 11 and smart light bulb 21. Various versions of circuitry 10 may not necessarily incorporate all of the components shown which depend on the design and operations desired or needed from the circuitry.

Socket 11 may incorporate a control electronics module 62. Module 62 may have a power supply 41 connected to a power source 63 via line 15 (phase) and line 16 (neutral). A configuration electronics module 14 of module 62 may have a memory 64 connected to it. Memory 64 may store various kinds of configuration information for the smart light bulb 21. Configuration information may be received by a receiver 65 via an antenna 66. The wireless transmit power can be curtailed to the point that only light bulbs in immediate vicinity are able to receive the configuration. This assures that light bulbs spaced apart can maintain their individual settings. In support of this, the RF antenna of the configuration electronics module 14 can have an antenna with a shaped radiation pattern to avoid reception of RF signals by nearby light bulbs. This for example can be achieved by having the outer socket housing 11 act as a shield. The light bulb can query the configuration information from configuration electronics module 14. Alternatively, configuration module 14 can periodically transmit the configuration information without any external trigger. Configuration information could be received via a wire rather than a wireless medium. The wireless medium may be classic RF, light, or the like. Configuration information may instead be received via optical fiber instead.

Configuration information may go to configuration electronics module 14, which processes the information that is sent out via a transmitter 42 and antenna 43 to smart light bulb 21. Transmission may be via RFID devices in control electronics module 62 of smart socket 11 and control electronics 22 of smart light bulb 21. Alternatively, transmission of configuration information to smart light bulb 21 may be via wire or other media.

Power supply 41 may provide power to configuration electronics module 14, transmitter 42 and receiver 65. Configuration information may have settings that may be provided to configuration electronics module 14 and memory 64. Memory 64 may be a chip that could be replaced with another chip with different configuration information.

Besides power supply 41, transmitter 42, configuration electronics module 14, memory 64 and receiver 65 may be a part of control electronics module 62. Other components may likewise be a part of module 62.

A socket or insertion mechanism 12 for screwing or plugging in smart light bulb 21 may have contacts 55 and 56 for connecting lines 15 and 16, respectively, from power source 63 to a power supply 44 of control electronics module 22. Power supply 44 may provide power to a configuration electronics module 67, receiver 45, transmitter 68, and LED drive circuit 47. Other components may be powered by power supply 44.

As an example of transmitting configuration information from smart socket or fixture 11, transmitter 42 via antenna 43 may send out or emanate signals from configuration electronics module 14 and memory 64 that are detected by receiver 45 via antenna 46. The signals may go to configuration electronics module 67 which processes the signals for LED drive circuit 47, which may control the power from power supply 44 to LED 48 in accordance with configuration information. LED 48 may be regarded as a primary light source in bulb 21. Light source 48 may be another kind of source (e.g., fluorescent, incandescent, or other kind of source).

Control electronics 22 may incorporate a transmitter 68 and antenna 69 for purposes of communicating information back to smart socket 11, or to other smart bulbs and/or smart fixtures, such as in a mesh network. Components may be added or left out of control electronics module 22, or bulb 21 in general.

Figure 3:
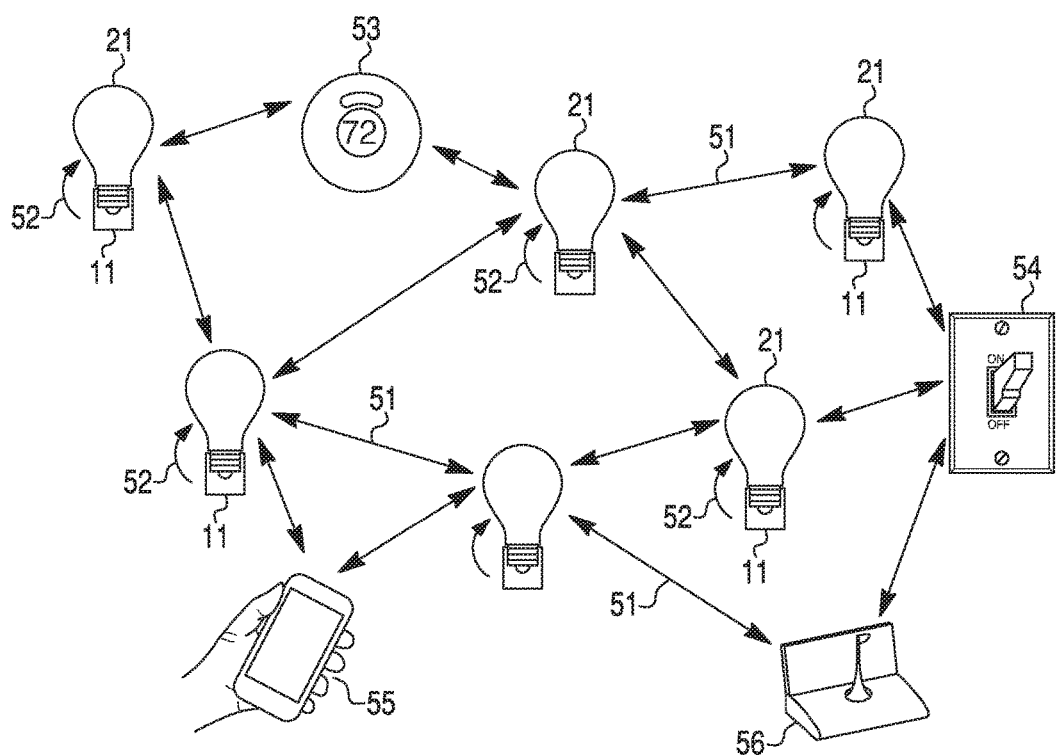
FIG. 3 is a diagram of an internet of things system having a mesh network of bulbs.

FIG. 3 is a diagram of an IoT mesh network system. Between each light bulb 21 and its socket 11 may be a low power short range configuration link 52. There may be a mesh network 51 among the light bulbs 21. Thermostat 53 and switch 54 may be other non-bulb devices in the IoT system. For instance, the IoT system may incorporate a mobile device 55. Also, a gateway 56 may be situated in the IoT system. Alternatively, there may be a mesh network 51 among the smart sockets or fixtures 11 using appropriate components present in each of the smart fixtures 11 as shown in FIG. 2, or adding them to each of smart fixtures 11 so as to achieve the mesh network among the fixtures 11.

The IoT mesh network may have two or more smart sockets. Two or more smart light bulbs may be inserted in the two or more smart sockets, respectively. The two or more smart light bulbs may be interconnected with one another with communication links. Each smart light bulb may have an exclusive connection with a smart socket in which the smart light bulb is inserted.

To recap, an internet of things (IoT) smart light bulb system may incorporate a smart fixture, a smart light bulb that can be inserted into and connect to the smart fixture for power to the smart light bulb, and a memory situated in the smart fixture. The smart light bulb may be configured by reading configuration information from the memory in the smart fixture.

The smart light bulb may be connected to the memory by a contact between conductors from the smart fixture and the smart light bulb, upon the insertion of the smart light bulb into the smart fixture.

The memory may be a wireless memory tag affixed to the smart fixture. The wireless memory tag may be read by a tag reader in the smart light bulb to obtain configuration information for the smart light bulb.

The system may further incorporate a control electronics module situated in the smart light bulb, a wireless receiver in the smart light bulb connected to the control electronics module, and a wireless transmitter in the smart fixture connected to the memory.

The memory may contain configuration information for the smart light bulb.

The smart light bulb may incorporate a light source having one or more LEDs. The control electronics module may incorporate a LED drive circuit connected to the one or more LEDs.

The control electronics module may further incorporate a power feed circuit having a first set of terminals. The smart fixture may incorporate a power supply having a second set of terminals for connection to the first set of terminals upon insertion of the smart light bulb into the smart fixture.

The wireless transmitter may emanate signals that contain the configuration information from the memory. The wireless receiver may receive the signals from the wireless transmitter and decipher the configuration information from the signals.

The signals of the wireless transmitter and the wireless receiver may operate in a context of near field communications (NFC) or Bluetooth.

The wireless transmitter may periodically transmit the configuration information without being externally prompted.

The smart fixture may further incorporate a receiver that is connected to the memory. Signals received by the receiver may contain information that adds to or changes the configuration information in the memory.

The signals received by the receiver may be sent by a smart phone.

An approach for configuring a smart bulb may incorporate inserting a smart bulb, having a light source, in a smart socket, connecting a control electronics module in the smart bulb, to the light source, connecting a wireless receiver in the smart bulb to the control electronics module, and connecting a wireless transmitter in the smart socket to a memory in the smart socket.

The memory may contain configuration information that can be provided via the wireless transmitter to the wireless receiver and the control electronics module, respectively. The configuration information may be for configuring the light source.

If the smart bulb is replaced with a new smart bulb, the new smart bulb may be configured with the configuration information in the memory that is read by the wireless transmitter and transmitted to the wireless receiver which in turn may provide the configuration information to the control electronics module for configuring the light source.

The configuration information may incorporate one or more features of the smart bulb selected from a group comprising a device address, a device descriptor, location, light color, light brightness, light patterns, and on and off times.

The configuration information may incorporate a unique identifier to enable the smart bulb to obtain full configuration information from a remote configuration service. The unique identifier may serve as a lookup key for the configuration information.

The approach may further incorporate connecting a second receiver in the smart socket to the memory of the smart socket, and transmitting new, updated, replacement, or additional configuration information to the second receiver for entry in the memory.

The new, updated, replacement, or additional configuration information may be sent to the second receiver from a smartphone.

An internet of things mesh network may incorporate two or more smart sockets, and two or more smart light bulbs inserted in the two or more smart sockets, respectively. The two or more smart light bulbs may be interconnected with one another with communication links. Each smart light bulb may have an exclusive connection with a smart socket in which the smart light bulb is inserted.

A smart socket may contain a configuration for a smart light bulb inserted in the smart socket, respectively.

The network may further incorporate one or more non-light bulb devices having communication links with the one or more smart light bulbs.

The one or more non-light bulb devices may be selected from a group comprising thermostats, switches, mobile phones, dimmers, light detectors, and gateways.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A light bulb fixture configured to receive a light bulb, the light bulb fixture comprising:
    a housing having a socket configured to receive the light bulb and shield light bulbs other than the light bulb from radio frequency (RF) signals; and
    a control electronics module disposed in the socket housing, the control electronics module including:
        a memory configured to include light bulb configuration information;
        a configuration electronics module operatively coupled to the memory and configured to access the memory for the light bulb configuration information and process the light bulb configuration information to obtain settings for the light bulb to operate; and
        a wireless transmitter operatively coupled to the memory and the configuration electronics module and configured to transmit the RF signals, that include the settings for the light bulb, to the light bulb received in the socket of the housing, wherein the wireless transmitter includes an RF antenna configured to transmit the RF signals having a shaped radiation pattern to avoid reception of the RF signals by the light bulbs other than the light bulb.

2. The light bulb fixture of claim 1, wherein the shaped radiation pattern of the RF signals is produced by the shield configuration of the socket.

3. The light bulb fixture of claim 1, further comprising a power supply having a set of terminals for connection to a set of terminals of the light bulb to power the light bulb upon insertion of the light bulb into the socket.

4. The light bulb fixture of claim 1, wherein the wireless transmitter is configured to transmit the light bulb the settings for the light bulb in near field communication (NFC) signals.

5. The light bulb fixture of claim 1, wherein the wireless transmitter is configured to transmit the light bulb the settings for the light bulb in Bluetooth signals.

6. The light bulb fixture of claim 1, wherein the wireless transmitter is configured to periodically transmit the light bulb the settings for the light bulb without being externally prompted.

7. The light bulb fixture of claim 1, further comprising:
    a receiver that is connected to the memory; and
    wherein the receiver is configured to receive signals that contain information that adds to or changes the light bulb configuration information in the memory.

8. The light bulb fixture of claim 7, wherein the receiver is configured to receive the signals sent by a smart phone.

9. The light bulb fixture of claim 1, wherein the settings for the light bulb to operate comprise a device address, a device descriptor, and location information.

10. A light bulb fixture system comprising:
    a light source; and
    a light bulb fixture including:
        a housing having a socket configured to receive the light source and shield light sources other than the light source from radio frequency (RF) signals; and
        a control electronics module disposed in the socket housing and configured to control power to the light source, the control electronics module including:
            a memory configured to include light bulb configuration information ; a configuration electronics module operatively coupled to the memory and configured to access the memory for the light bulb configuration information and process the light bulb configuration information to obtain settings for the light source to operate; and a wireless transmitter operatively coupled to the memory and the configuration electronics module and configured to transmit the RF signals, that include the settings for the light source, to the light source received in the socket of the housing, wherein the wireless transmitter includes an RF antenna configured to transmit the RF signals having a shaped radiation pattern to avoid reception of the RF signals by the light sources other than the light source.

11. The light bulb fixture system of claim 10, the light source further comprising:
    a conductor configured to contact a conductor in the socket in which the light source is received; and
    wherein the control electronics module is configured to connect to the light source via the conductor.

12. The light bulb fixture system of claim 10, further comprising a tag reader configured to obtain confirmation information from a wireless memory tag.

13. The light bulb fixture system of claim 10, wherein the light source comprises one or more LEDs and the light source includes a light source drive circuit comprising an LED drive circuit connected to the one or more LEDs.

14. The light bulb fixture system of claim 10, wherein the control electronics module comprises a power feed circuit having a first set of terminal configured to connect to a second set of terminals upon insertion of the light source into a light bulb fixture.

15. The light bulb fixture system of claim 10, further comprising a wireless receiver configured to receive signals and decipher light bulb configuration information from the signals.

16. The light bulb fixture system of claim 15, wherein the wireless receiver is configured to receive the signals sent by a smart phone.

17. The light bulb fixture system of claim 15, wherein the wireless receiver is configured to receive near field communications (NFC) or Bluetooth signals.

18. A method of configuring a light bulb using a light bulb fixture, the method comprising:
- inserting a light bulb into the light bulb fixture, wherein the light bulb fixture includes:
  - a housing having a socket configured to receive the light bulb and shield light bulbs other than the light bulb from radio frequency (RF) signals; and
  - a control electronics module including a memory, a configuration electronics module, and a wireless transmitter disposed in the housing, the control electronics module including:
- accessing the memory, using the configuration module, for light bulb configuration information in response to the inserting of the light bulb into the light bulb fixture;
- processing the light bulb configuration information, using the configuration module, to obtain settings for the light bulb to operate; and
- transmitting the RF signals that include the settings for the light bulb, to the light bulb, wherein the wireless transmitter includes an RF antenna configured to transmit the RF signals having a shaped radiation pattern to avoid reception of the RF signals by the light bulbs other than the light bulb.

19. The method of claim 18, wherein the configuration information comprises one or more features selected from a group consisting of a device address, a device descriptor, a location, a light color, a light brightness, a light pattern, and on and off times.

20. The method of claim 18, wherein:
- the configuration information comprises a unique identifier to enable the light bulb to obtain full configuration information from a remote configuration service; and
- the unique identifier serves as a lookup key for the configuration information.

* * * * *